June 27, 1972 V. F. COTY ETAL 3,672,953
PROCESS FOR GROWING CELLS OF A MICROORGANISM ON A
CARBON-CONTAINING LIQUID SUBSTRATE
Filed Feb. 9, 1970
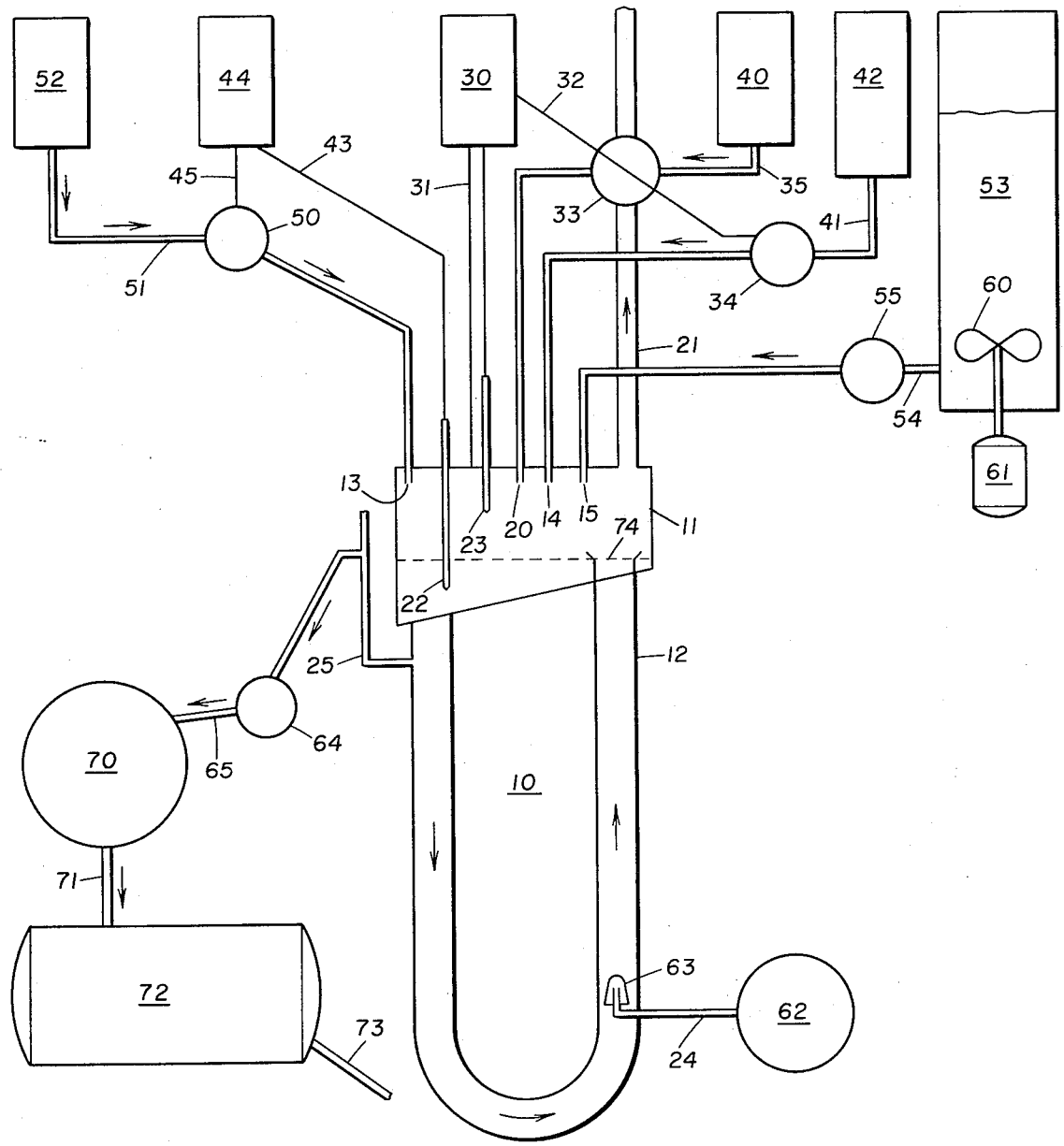
VERNON F. COTY
ISRAEL J. HEILWEIL
RICHARD I. LEAVITT
INVENTORS
BY Frederick E. Dumoulin
ATTORNEY

United States Patent Office 3,672,953
Patented June 27, 1972

3,672,953
PROCESS FOR GROWING CELLS OF A MICROORGANISM ON A CARBON-CONTAINING LIQUID SUBSTRATE
Vernon F. Coty, Trenton, Israel J. Heilweil, Princeton, and Richard I. Leavitt, Pennington, N.J., assignors to Mobil Oil Corporation
Filed Feb. 9, 1970, Ser. No. 10,172
Int. Cl. C12b 1/00
U.S. Cl. 195—28                   10 Claims

ABSTRACT OF THE DISCLOSURE

A process for growing cells of a microorganism on a carbon-containing liquid substrate which is partially water-insoluble wherein it is desirable that the amount of the residual substrate in relation to the amount of the cells be as low as possible. The amount of the residual substrate is kept low by maintaining a low concentration of the substrate in the culture medium during growth of the cells. The latter is accomplished by introducing liquid substrate into the culture medium in response to the presence on the surface of the culture medium of a layer of foam of a predetermined height. An antifoaming agent is also employed.

BACKGROUND OF THE INVENTION

Field of the invention

This invention relates to the growing of cells of a microorganism on a carbon-containing liquid substrate which is partially water-insoluble and relates more particularly to a process for growing such cells wherein the amount of residual substrate in the cells obtained as a product from the growth procedure is low.

Description of the prior art

The growth of cells of a microorganism on a carbon-containing liquid substrate which is partially water-insoluble is well known. In such growth procedures, an inoculum of the microorganism, the substrate, an aqueous mineral salt nutrient, and an oxygen-containing gas are introduced into a fermenter to form a culture medium. The substrate provides a source of carbon for the growth of the cells. The aqueous mineral salt nutrient provides water and inorganic salts, and the oxygen-containing gas, which ordinarily is supplied continuously to the fermenter during the growth procedure, provides oxygen, each of which is also required for growth of the cells. The cells of the microorganism are the desired product of the growth procedure and at the end of the growth procedure are removed and recovered from the culture medium.

Recently, attention has been given to such procedures for the growth of a microorganism upon a carbon-containing liquid substrate which is partially water-insoluble, such as a liquid hydrocarbon, since the cells obtained therefrom can provide a source of low cost, and easily obtainable, protein feed for animals and even for humans. However, where the cell product obtained from such procedures is to be used as a protein feed, it is desirable that the amount of the substrate remaining as a residue from the growth procedure in the cell product be as low as possible. The cell product of the growth procedure may be treated for the removal of the residual substrate, such as by washing with volatile solvents for the substrate and then removing the solvent. Removal of the substrate may also be effected by passing the cell product to a secondary fermenter and permitting fermentation to continue with introduction of oxygen-containing gas whereby the residual substrate is consumed. However, where the amount of residual substrate is high, the cost of removal can be sufficiently great that the economics of the overall procedure is seriously affected.

SUMMARY OF THE INVENTION

The invention provides a means whereby the amount of the substrate in the culture medium is maintained during the growth procedure at a low value. As a result, when the cell product is removed from the culture medium, the cell product will contain a small amount of the substrate. Maintenance of the amount of the substrate in the culture medium during the growth procedure is effected by introducing additional substrate into the culture medium during the growth period only in response to the presence on the surface of the culture medium of a layer of foam of predetermined height. Antifoaming agent is also employed.

In the practice of the invention, an inoculum of the microorganism whose cells are to be grown is introduced into a fermenter along with a carbon-containing liquid substrate which is partially water-insoluble, the aqueous mineral salt nutrient, and an oxygen-containing gas to form a culture medium. Introduction of the substrate is discontinued and the microorganism is permitted to grow on the substrate contained in the culture medium. Thereafter, additional substrate is introduced into the fermenter only when the foam on the surface of the culture medium exceeds a predetermined height. Antifoaming agent is also introduced into the fermenter. Effluent containing cells of the microorganism is subsequently removed from the fermenter.

BRIEF DESCRIPTION OF THE DRAWING

The accompanying drawing is a schematic flow diagram illustrating an embodiment of the invention and apparatus that may be employed in the practice of the invention.

DESCRIPTION OF THE PREFERRED EMBODIMENTS

The process of the invention is based upon the observation that significant quantities of foam appear upon the surface of the culture medium when the substrate has been consumed by the cells of the microorganism and free substrate has decreased to a certain minimal amount in the culture medium.

Apparently, foaming agents ordinarily are part of the metabolic products of the growing cells of the microorganism. These foaming agents are relatively ineffective as long as unconsumed substrate is present in the culture medium, the substrate acting to suppress the formation of foam. However, when the substrate has been consumed, and free substrate is no longer present, the substrate no longer acts to suppress the formation of foam and a layer of foam forms on the surface of the culture medium. The layer of foam thus becomes an indicator that the amount of substrate in the culture medium is at a low value or that the substrate has been entirely consumed. With the appearance of the layer of foam upon the surface of the culture medium, substrate is added to the culture medium. With addition of the substrate to the culture medium, and with an antifoaming agent being present in the culture medium, the foam layer subsides. When the added substrate becomes consumed by the microorganisms, the foam layer again appears. The procedure of adding substrate to the culture medium only upon appearance of the foam layer and discontinuing addition of substrate when the layer of foam subsides is repeated until the growth procedure is terminated. As a result, the amount of unconsumed substrate in the culture medium, and in the cell product, is low.

As stated, the substrate acts to suppress the formation of foam. However, the substrate alone is not capable of entirely eliminating the formation of foam. Accordingly, also as stated, an antifoaming agent is employed and is introduced into the fermenter. Introduction of this antifoaming agent is by the time the introduction of at least a portion of the additional substrate is completed. Thus, the antifoaming agent may be introduced into the fermenter prior to the time any of the additional substrate is introduced into the fermenter. For example, the antifoaming agent may be introduced into the fermenter at the time the inoculum of the microorganism, the substrate, and the aqueous mineral salt nutrient are first introduced into the fermenter. Similarly, the antifoaming agents may be introduced into the fermenter subsequent to the time the inoculum of the microorganism, the substrate, and the aqueous mineral salt nutrient are introduced into the fermenter but prior to the time any additional substrate is introduced into the fermenter. Further, the antifoaming agent may be introduced into the fermenter along with the additional substrate. For example, the antifoaming agent may be introduced into the fermenter simultaneously with the additional substrate. This can be effected by introducing the antifoaming agent and the additional substrate as separate streams simultaneously into the fermenter or the antifoaming agent may be mixed with the additional substrate and the mixture introduced as a single stream into the fermenter. It is not necessary that the antifoaming agent be introduced into the fermenter simultaneously with the very first portion of any additional substrate. However, antifoaming agent should be introduced into the fermenter before the step of adding any additional substrate is completed. Thus, introduction of antifoaming agent can be initiated shortly after the introduction of additional substrate is started but before any appreciable amount of additional substrate is introduced. As another alternative, antifoaming agent may be introduced into the fermenter prior to any additional substrate and antifoaming agent introduced into the fermenter simultaneously with additional substrate.

The antifoaming agent is employed in an amount that is insufficient to effect deleteriously the growth of the microorganism. Further, the amount employed is insufficient to suppress entirely the formation of foam since, if such an amount were to be employed, foam would not appear as an indicator that the amount of unconsumed substrate was at a low value. These amounts will vary with the microorganism being grown, the substrate, the aqueous salt nutrient medium, the temperature of incubation, and the type of antifoaming agent so that precise amounts cannot be stated. However, it may be stated that the antifoaming agent ordinarily is employed in an amount that is between about 0.001 and 10 percent by weight of the culture medium.

The process is applicable to the growth of any microorganism that is capable of utilizing a carbon-containing liquid substrate as a source of carbon. The microorganisms are aerobic microorganisms. Included among them are bacteria, fungi, yeasts, and molds.

Of the bacteria, suitable genera include Pseudomonas, Bacillus, Flavobacterium, Sarcina, etc. Illustrative species of these genera are *P. aeruginosa, P. oleovorans, P. putida, P. boreopolis, P. methanica, P. fluorescens, P. pyocyanea; B. aureus, B. acidi, B. subtilis, B. urici, B. cereus, B. coagulans, B. mycoides, B. circulans, B. megaterium; Flavobacterium aquatile; Sarcina alba, Sarcina lutea.*

Other preferred genera are Achromobacter and Nocardia, as illustrated by species such as *A. xerosis, A. agile, A. guttatus, A. superficialis, A. parvulus, A. cycloclastes; N. salmonicolor, N. asteroides, N. minimus, N. opaca, N. corallina, N. rubra,* and *N. paraffinae.* The genus Mycobacterium is useful, particularly such species as *M. parafficum, M. phlei, M. lacticola, M. rhodochrous, M. smegmatis, M. rubrum, M. luteum* and *M. albus.*

Still other hydrocarbon-utilizing bacteria are *Methanomonas methanica* and Methanomonas sp.; *Micrococcus paraffinae; B. aliphaticum; B. hidium,* and *B. benzoli* from the genus Bacterium; and species of Micromonospora. Other useful genera include Brevibacterium, Aerobacter, and Corynebacterium.

Of the fungi, the process is applicable to any fungus within the classification Eumycetes or true fungi, but preferably from the classification Fungi Imperfecti or from the classification Phycomycetes. Preferred fungi from the classification Fungi Imperfecti are species of the genera Aspergillus and Penicillium, as illustrated by *A. niger, A. glaucus, A. oryzae, A. flavus, A. terreus, A. itaconicus; P. notatum, P. chrysogenum, P. glaucum, P. griseofulvum, P. expansum, P. digitatum, P. italicum,* etc. Other suitable microorganisms include various species of the genera Monilia, Helminthosporium, Alternaria, Fusarium, and Myrothecium. Preferred fungi of the class Phycomycetes include species from the genera Rhizopus and Mucor, such as *R. nigricans, R. oryzae, R. delemar, R. arrhizus, R. stolonifer,* R. sp.; *M. mucedo,* and *M. genevensis.*

Some of the foregoing genera of fungi are also characterized as molds, such as Aspergillus, Penicillium, Rhizopus, and Mucor, but it will be understood that all are true fungi or Eumycetes.

Of the yeasts, the preferred microorganisms are of the family Cryptococcaccae, and particularly of the subfamily Cryptococcoidae. Preferred genera are Torulopsis (or Torula) and Candida. Preferred species are *Candida lipolytica, Candida pulcherrima, Candida utilis, Candida utilis* Variati major, *Candida tropicalis, Candida intermedia;* and *Torulopsis colliculosa.* Other useful species are *Hansenula anomala,* and *Oidium lactus.* Also included are Pichia and Trichosporan.

The substrate is one that is liquid, which contains carbon, and which is partially water-insoluble. By liquid is meant that the substrate is in the liquid phase at the temperature, i.e., incubation temperature, and the pressure at which the growth procedure is carried out. By containing carbon is meant that the molecules of the substrate contain carbon atoms which may be utilized as a source of carbon for the growth of the microorganisms. By partially water-insoluble is meant that the substrate is not miscible with water in all proportions.

A suitable substrate is a hydrocarbon. Aliphatic hydrocarbons are preferred, and these may be saturated or unsaturated, straight or branched chain hyrrocarbons having up to 20 or 30 or 40 or more carbon atoms. Saturated straight chain hydrocarbons having up to 20 carbon atoms are particularly desirable. Cyclic hydrocarbons, comprising aromatic and alicyclic compounds, are also of use, including alkyl-substituted cyclic compounds having 1, 2, or more alkyl substituents each of any suitable length, chain configuration, and degree of saturation, and in which the cyclic moiety is aromatic or cycloparaffinic. Alkyl-substituted aromatic hydrocarbons include toluene, the various xylenes, mesitylene, ethylbenzene, p-cymene, the diethylbenzenes, and the isomeric propylbenzenes, butylbenzenes, amylbenzenes, heptylbenzenes, and octylbenzenes. Among the useful alkyl-substituted cycloparaffins are methylcyclopentane, the di- and trimethylcyclopentanes, ethylcyclopentane, the diethylcyclopentanes, the various propyl-, butyl-, amyl-, hexyl-, and octylcyclopentanes. Also the alkylcyclohexanes, which are substituted in a manner corresponding to the foregoing alkylcyclopentanes, and further including such compounds as the various tetramethylcyclohexanes, methylethylcyclohexanes, methylpropylcyclohexanes, and the like, may be employed.

Crude oils, various petroleum fractions, residue, hydrocarbon derivatives such as from shale and coal, polymers containing synthetic olefins, etc. are of use.

Other suitable carbon-containing liquid substrates may be employed. These include oxygenated hydrocarbons. Thus, alcohols containing five or more carbon atmos, i.e., pentyl and higher alcohols may be employed. Aldehydes and ketones containing five or more carbon atoms may also be employed. Organic compounds containing nitrogen and/or sulfur and/or phosphorus may also be used. These other substrates may be straight chain or cyclic compounds.

It will be appreciated that normally solid hydrocarbon substrates may be used by dissolving them in a hydrocarbon solvent or in any other conventional inert nontoxic solvent. Where hydrocarbons are employed as a solvent, they themselves, as well as the solute, may be utilized as the substrate.

The aqueous mineral salt nutrient comprises a source of nitrogen, such as a nitrate or a nitrite, ammonia or an ammonium salt, or urea, to produce the protein. It also comprises a source of such ions as potassium, magnesium, phosphate, and sulfate, as well as ions of trace elements like molybdenum, cobalt, etc., also required for growth of the microorganisms. Most, if not all, of these ions will usually be present in sufficient quantity in ordinary potable water. However, it is desirable to add the ions to the neutrient to ensure their presence in sufficient quantity for growth. A suitable aqueous mineral salt nutrient is listed as follows:

TABLE I

| | Grams/liter |
|---|---|
| Potassium monohydrogen phosphate | 6.0 |
| Sodium dihydrogen phosphate | 9.0 |
| Sodium molybdate | 0.006 |
| Cobaltic chloride | 0.006 |
| Magnesium sulfate | 0.6 |
| Ammonium sulfate | 6.0 |

Another suitable aqueous mineral salt nutrient is as follows:

TABLE II

| | Grams/liter |
|---|---|
| Sodium monohydrogen phosphate | 9.0 |
| Potassium dihydrogen phosphate | 6.0 |
| Ammonium sulfate | 6.0 |
| Magnesium sulfate | 0.6 |
| Sodium carbonate | 0.3 |
| Calcium chloride | 0.03 |
| Ferrous sulfate | 0.015 |
| Manganese sulfate | 0.006 |
| Cobaltic chloride | 0.006 |
| Sodium molybdate | 0.006 |

An oxygen-containing gas is introduced into the culture medium during the growth procedure. Ordinarily, this oxygen-containing gas is air although other oxygen-containing gases may be employed. Introduction of the oxygen-containing gas preferably is effected by injecting the oxygen-containing gas directly into the culture medium. However, introduction may also be effected by exposure of the surface of the culture medium to the oxygen-containing gas and agitating the culture medium so as to present an ever-changing surface to the oxygen-containing gas. Introduction of the oxygen-containing gas may be effected by using a trickling filter.

The introduction of the oxygen-containing gas serves primarily to provide the oxygen required for growth of the microorganisms. However, the introduction of the oxygen-containing gas may also serve other purposes. For example, the introduction of the oxygen-containing gas, where it is effected by injection directly into the culture medium, may serve to assist, or to provide the sole means, for agitating the culture medium to obtain the desired contact of the aqueous mineral salt nutrient, the substrate, the microorganism, and the oxygen-containing gas. The introduction of the oxygen-containing gas, further, may also serve to effect cooling of the culture medium depending upon its temperature relative to that of the culture medium and its water content relative to its water content at saturation at the temperature of the culture medium.

The growth procedure may be carried out at any temperature at which the microorganisms will grow. These temperatures will range between 20° C. and 55° C. Preferably, the growth reaction is carried out at a temperature between 30° C. and 40° C. If desired, or necessary, the culture medium may be cooled or heated to obtain the desired temperature. Cooling may be effected as a result of injection of the oxygen-containing gas, as mentioned above. If the oxygen-containing gas, for example, air, has an ambient temperature and humidity, i.e., degree of water saturation, such that its introduction into the culture medium will not effect cooling, its temperature or humidity, or both, many be lowered prior to introduction into the culture medium. Alternatively, cooling may be effected by other means such as by circulation of a cooling medium through a jacket or a cooling coil contacting the culture medium. Heating may be effected by means of an electrically heated jacket or other device contacting the culture medium. Automatic temperature control means, of conventional kind, may be used to maintain the desired temperature.

The growth procedure is carried out, as is well known in the art, at a suitable pH for the growth of the microorganism, the pH being in the range of 3.0 to 8.5, preferably 3.5 to 7.0, and adjustments can be made during the course of the growth procedure by addition to the culture medium of alkaline material, such as ammonia, or acidic material such as phosphoric, hydrochloric, or sulfuric acid.

Any antifoaming agent which has heretofore been employed in the growth of a microorganism on a carbon-containing liquid substrate which is partially water-insoluble will be satisfactory. The antifoaming agents have oil solubility and will have an HLB (Hydrophile-Lipophile Balance) of less than 10. The antifoaming agents that may be employed may be nonionic or ionic antifoaming agents.

Nonionic antifoaming agents include compounds having an aromatic nucleus, such as a phenyl ring, substituted by a side chain of hydrophilic character such as a polyoxyethylene group, and by a side chain of lipophilic character such as an alkyl group. Agents of this kind are frequently referred to as polyoxyethylene alkyl aryl ethers, obtainable by reacting an alkylphenol with ethylene oxide. Other nonionic agents are polyoxyethylene glycols and alkyl ether derivatives thereof and methoxy polyoxyethylene glycols and their ester derivatives. Still other agents are fatty acid esters, including mono- and diesters, formed from a polyol and a fatty acid. The polyol may be glycol, glycerol, sorbitol, sorbitan, mannitol, propylene glycol or polyoxyethylene glycol and the acid may be an aliphatic monocarboxylic acid, saturated or unsaturated, straight or branched chain. Examples are glycerol mono- and dilaurates, glycerol mono- and dioleates, glycerol mono- and distearates, glycerol monopalmitate, glycerol monomyristate, propylene glycol monostearate, propylene glycol monopalmitate, propylene glycol monooleate, and mixtures thereof. Others are sorbitan laurate, sorbitan mono- and tristearates, sorbitan mono- and trioleates, mannitan stearates, palmitates, and laurates, mono-, di-, and triglycerides of fatty acids like oleic, palmitic, and stearic, glycerol sorbitan laurate, polyoxyethylene laurates, stearates, oleates, and palmitates, and polyoxyethylene sorbitan palmitates, oleates, stearates and laurates. Sucrose mono- and dipalmitates are suitable as well as other mono- and diesters of sucrose and fatty acids including monooleate, sucrose dilaurate, sucrose dimyristate, sucrose distearate, sucrose dioleate and the like.

Other suitable nonionic antifoaming agents are fatty acid derivatives formed by reaction of a fatty acid and ethylene oxide and alcohol derivatives formed by reaction of a fatty alcohol with ethylene oxide. Still other agents are fatty amide derivatives having an oxygenated side chain of hydrophilic character, with the lipophilic portion of the compound being due to the amide grouping. These derivatives may be formed by reaction of a fatty acid amide and ethylene oxide or by reaction of a fatty acid ester with an alkanol amine.

Other nonionic agents are those obtained by addition of ethylene oxide to polypropylene glycols.

As to ionic antifoaming agents, these may be cationic, anionic, or amphoteric, and may be used singly or in combination. Anionic agents include long chain alkane sulfonates, long chain amides of sulfosuccinic acid and phosphate esters. Cationic agents may be exemplified by long chain tetraalkylammonium bromides and long chain alkylamine hydrochlorides. A suitable antifoaming agent is a weakly cationic amine-type compound having the formula:

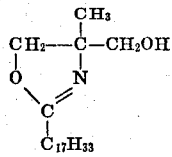

Other antifoaming agents include solid, insoluble particles having a surface area of less than 50 square meters per gram of poly-2,6-dimethyl-1,4-phenylene oxide, a copolymer of 2,6-dimethyl phenol and 2-methyl-1,6-tetradecyl phenol wherein the proportion of the 2-methyl-1,6-tetradecyl phenol does not exceed about 20 percent by weight of the copolymer, a copolymer of vinyl stearate and maleic anhydride, sublimed sulfur, silicon carbide, and polytetrafluoroethylene comminuted under cryogenic conditions.

It will be understood that two or more different antifoaming agents may be employed simultaneously or singly.

The antifoaming agents have a hydrophilic-lipophilic character. Thus, they will act also as emulsifying agents and can serve to effect emulsification of the substrate and the aqueous mineral salt nutrient. Further, at least some of these agents, particularly in the absence of a substrate which is partially water-insoluble, and under particular conditions of pH, temperature, salt content, etc. have been recognized by those skilled in the art to promote foaming. However, those skilled in the art can select an agent that, for any given conditions of growth of a microorganism, will not promote foaming.

The growth procedure may be carried out as a batch reaction or as a continuous reaction.

In a batch growth procedure, desired amounts of the substrate and aqueous mineral salt nutrient are introduced into the fermenter or reaction vessel. The fermenter may be any type of batch fermenter heretofore employed for the growth of microorganism. An inoculum of the microorganism is introduced into the mixture of the substrate and the aqueous mineral salt nutrient in the fermenter and the oxygen-containing gas is also introduced into the mixture in the fermenter. Growth of the microorganism begins and growth will initially be at a low rate. Stated otherwise, initially, the density of the cells of the microorganism will increase at a low rate. This is the so-called lag phase growth period. Thereafter, the rate of growth increases, and this increased rate of growth is the exponential, or logarithmic, growth phase. In this phase, the cell density of the cells of microorganism in the culture medium increases at an exponential rate. Finally, the growth rate no longer increases, and the cell density of the microorganism in the culture medium becomes stationary, or constant. This stage is the maximum stationary phase. Oxygen-containing gas is introduced into the culture medium throughout the lag and exponential growth phase and is discontinued to terminate the growth procedure when the culture medium enters the maximum stationary phase. At this point, the culture medium is treated for separation and recovery of the cells of the microorganism. At any other stage, the growth reaction may be stopped, as by discontinuing the supply of oxygen-containing gas to the culture medium, and the culture medium treated for separation and recovery of the cells of the microorganism. Ordinarily, however, this is not done since the yield of the cells of the microorganism will be less than if the growth reaction is permitted to go to the maximum stationary phase.

In a continuous growth reaction, desired amounts of the substrate and aqueous mineral salt nutrient are introduced into a fermenter and an inoculum of the microorganism and the oxygen-containing gas are introduced into the fermenter, similarly as in the batch growth procedure. Growth of the microorganism begins and the culture medium, with continued introduction of the stream of oxygen-containing gas, is permited to go through the lag phase and enter the exponential growth phase. At some point in the exponential growth phase, continuous operation is begun. This is accomplished by introducing continuously a stream of substrate and a stream of aqueous mineral salt nutrient and removing an effluent stream from the culture medium. The oxygen-containing gas is, of course, also introduced continuously into the culture medium. The input flow rate of the combined streams of substrate and aqueous mineral salt nutrient equals the flow rate of the stream of effluent. The input flow rate and the effluent flow rate are maintained substantially constant and are selected not to exceed what is termed the critical dilution rate. This is the rate that will effect a sufficient residence time in the fermenter of the introduced streams of substrate and aqueous mineral salt nutrient to maintain the density of th ecells of the microorganism in the culture medium substantially constant without washout. The effluent stream from the fermenter is treated for the separation and recovery of the cells of the microorganism.

In the practice of the invention, wherein a batch growth procedure is employed, the batch growth procedure, as described above, is modified. Thus, only a portion of the substrate that would normally be employed to obtain a desired, and attainable, density of the cells of the microorganism in the culture medium is mixed initially with the aqueous mineral salt nutrient and the inoculum. In the growth of cells of a microorganism employing a substrate as a source of carbon, the number or amount of cells that may be obtained per unit amount of the substrate may be determined approximately. This number is a function of the type of microorganism, the temperature and pH of the culture medium, and various other factors. Thus, the amount of substrate required to obtain a desired cell density for any given volume of culture medium may also be determined approximately. For example, to obtain a desired density of cells of a microorganism, the amount of substrate to obtain a desired density of cells may be approximately 10% by volume of the culture medium. The total volume of the culture medium will be known, if nothing else being limited to the volume of the fermenter, and, accordingly, the opproximate amount of substrate will be known. The portion of this amount of substrate to be used initially for mixing with the aqueous mineral salt nutrient may be any desired portion. Ordinarily, however, this portion should be not more than 75%, and preferably, not more than 60% of the amount estimated to attain the desired cell density. For example, 50% or less may be employed.

As growth of the microorganism occurs with introduction of oxygen into the culture medium, the portion of the substrate contained therein is consumed and a layer of foam forms on the surface of the culture medium. In response to the appearance of the layer of foam, additional substrate is introduced into the culture medium. The amount of this substrate introduced into the culture medium should be, ideally, just sufficient to result in attainment of the desired cell density. However, since this cannot readily be determined with accuracy, the amount introduced is just sufficient to effect disappearance of the layer of foam. A finite time is required after the introduction of the additional amount of substrate before the layer of foam disappears. Accordingly, care must be taken not to introduce the additional amount of substrate at such a rate that an excess over that required for attainment of the maximum cell deensity, and thus the presence of residual substrate in the cell product, before the layer of foam disappears, is obtained. Introduction of an excess of additional substrate is avoided by introducing the additional substrate slowly, as a continuous stream, or intermittently as slugs, at a rate not greater than 10% of the volume of the culture medium in the fermenter per hour and is discontinued once the foam layer subsides.

In the practice of the invention, wherein a continuous growth procedure is employed, the growth procedure as described above is started. However, after the cell density in the culture medium has reached the desired level and continuous operation, as described above, would have begun, a modification is made. This modification is that while the continuous introduction of the stream of the aqueous mineral salt nutrient and the continuous removal of the stream of effluent containing the cell product is begun, and the introduction of the oxygen-containing gas is continued, additional substrate is not introduced into the culture medium until a layer of foam appears upon the surface of the culture medium. Upon the appearance of the layer of foam, additional substrate is introduced into the culture medium. The amount of the additional substrate added to the culture medium upon each appearance of the foam will be governed in accordance with conditions described above in connection with the batch growth procedure.

Additional substrate is introduced into the culture medium when the foam layer exceeds, as mentioned, a predetermined height. Depending upon the degree of agitation, a certain amount of foam will be present on the surface of the culture medium regardless of the amount of substrate in the culture medium. However, when the substrate in the culture medium has been consumed below a certain minimal amount by the cells of the microorganism, significant quantities of foam will appear on the surface of the culture medium. The amount of foam significant with respect to the absence of substrate in the culture medium depends upon the type of microorganism, the type of substrate being employed, the composition of the aqueous mineral salt nutrient and other factors. The amount of foam indicative of the fact that free substrate is no longer present in the culture medium, having been consumed by the cells of the microorganism, can be determined empirically for any given culture medium. However, ordinarily, when the foam reaches a height of at least about one-half inch, it may be regarded as being significant with respect to the absence of substrate. Thus, when the foam reaches a height of at least about one-half inch, substrate may be added to the culture medium. On the other hand, it may not be desired to control the height of the foam layer to this short distance. In this case, substrate may be added to the culture medium when the height of the foam layer is in excess of about one-half inch, as for example, one, two, three, or four inches. In any case, it is desired not to permit the height of the foam layer to exceed the depth of the culture medium by about 50%. Thus, additional substrate may be introduced when the height of the foam layer is between at least one-half inch and 50% of the depth of the culture medium, where the latter is greater than at least about one-half inch.

Introduction of hydrocarbon substrate into the fermenter may be effected automatically employing means for detecting the presence of foam on the surface of the culture medium. Thus, a probe, sensitive to the presence of foam, may be positioned above the surface of the culture medium. Such a probe may comprise two electrodes in a circuit which is closed by the foam, the foam being electroconductive by reason of containing aqueous salt nutrient medium, to trigger a relay which effects operation of means, such as a pump, for introducing the substrate. When the foam height reaches a predetermined level, as detected by the probe, the probe activates the means for introducing substrate, in the desired amount and at the desired rate, into the fermenter. When the foam height decreases below a predetermined level, also as detected by the probe, the probe deactivates the means for introducing the substrate into the fermenter. A suitable probe for this purpose is one manufactured by the New Brunswick Scientific Co., Inc.

Where a foaming agent is not part of the metabolic products of the growing cells of the microorganism, or a foaming agent is not produced in a sufficient quantity, a foaming agent may be added to the culture medium containing the cells of the microorganism. The foaming agent is employed in an amount that will not cause foaming in the presence of substrate in the culture medium. This amount, like the amount of antifoaming agent, will depend upon the type of agent, the microorganism, the substrate, the aqueous salt nutrient medium, and the temperature of incubation so that precise amounts can be stated. However, it can be stated that the foaming agent, where employed, will be employed in an amount that is between about 0.001 and 0.1 percent by weight of the culture medium. Suitable foaming agents include polyoxyethylene alkyl aryl ethers such as ethylene oxide ether of nonyl phenol containing 5 moles of ethylene oxide. Generally, any of the types of foaming agents heretofore listed but which have an HLB greater than 10 may be employed. Similarly to the antifoaming agent, the foaming agent should be one which has no, or little, deleterious effect on growth of the cells of the microorganism in the concentrations employed.

Referring to the drawing, a fermenter is shown at 10. The fermenter comprises an upper chamber 11 and a U-shaped chamber 12. The upper chamber 11 has an inlet pipe 13 for ammonia to control the pH in the culture medium contained in the fermenter, an inlet pipe 14 for hydrocarbon substrate, an inlet pipe 15 for aqueous mineral salt nutrient, an an inlet pipe 20 for antifoaming agent. The upper chamber 11 also has an exhaust outlet pipe 21. Further, it is provided with a pH probe 22 and a foam probe 23. The U-shaped chamber 12 is provided with an inlet pipe 24 for air and an outlet pipe 25 for effluent.

The foam probe 23 is connected to switch 30 and a ground connector 31 extends from the switch 30 to the upper chamber 11 to which it is electrically connected. Switch 30 is electrically connected through line 32 to pump 33 and pump 34. The pump 33 is connected through pipe 35 to reservoir 40 containing antifoaming agent and the pump 34 is connected through pipe 41 to reservoir 42 containing hydrocarbon substrate. The outlet from pump 33 is the pipe 20 entering the upper chamber 11 and the outlet from pump 34 is the pipe 14 also entering the upper chamber.

The pH probe 22 is connected through line 43 to switch 44. The switch 44 is connected through line 45 to pump 50. The pump 50 is connected through pipe 51 to reservoir 52 containing ammonia. The outlet from pump 50 is the pipe 13 entering the upper chamber 11.

Aqueous mineral salt nutrient is contained in reservoir 53. Pipe 54 leads to pump 55 and the outlet from pump 55 is the pipe 15 entering the upper chamber 11. Reservoir 53 is provided with a propeller 60 actuated by motor 61 to stir the aqueous mineral salt nutrient in order to dissolve the mineral salts in the water.

The inlet pipe 24 is connected to air compressor 62 and the pipe, within the U-shaped chamber 12, is provided with sparger 63.

The outlet pipe 25 is connected to pump 64 and the outlet of pump 64 is pipe 65 connected to centrifuge 70. Outlet pipe 71 connects the centrifuge 70 to dryer 72 and outlet pipe 73 leads from the dryer 72 to storage.

In operation, the desired mineral salts and water, in the desired proportions, are mixed in the reservoir 53, stirring of the mixture to dissolve the salts in the water being effected by the propeller 60. The resulting aqueous mineral salt nutrient is then pumped in the desired amount to the fermenter 10. Hydrocarbon substrate is pumped from reservoir 42 through pipe 41 by pump 34 through pipe 14, and antifoam agent is pumped from reservoir 40 through line 35 by pump 33 through line 20, to the fermenter 10. The mixture of hydrocarbon substrate, aqueous mineral salt nutrient and antifoam agent fills the U-shaped chamber 12 and extends to the level 74 in the upper chamber 11. The mixture is inoculated with a culture of the desired microorganisms and air is pumped into the U-shaped chamber by the air compressor 62 through pipe 24. The air leaves the pipe 24 through the sparger 63, the sparger serving to distribute the air finely in the mixture in the fermenter, and passes upwardly through the U-shaped chamber. The upward passage of the air effects upward movement of the culture medium in the right-hand leg of the U-shaped chamber. As a consequence, there is downward movement of the culture medium in the left-hand leg of the U-shaped chamber with the result that there is circulation of the culture medium in the fermenter with introduction of the air.

After the initial introduction of hydrocarbon substrate, aqueous mineral salt nutrient and inoculum, there is no further introduction of hydrocarbon substrate and aqueous salt nutrient, although introduction of air is continued, until the cell density in the fermenter has reached a desired level. At this time, the pump 55 is started to pump aqueous mineral salt nutrient continuously to the fermenter and the pump 64 is started to maintain the level 74 constant. Culture medium is removed through the pipe 25 by the pump 64 through pipe 65 to the centrifuge 70. In the centrifuge, the culture medium is centrifuged to separate the cells of the microoragnism from the liquid portion of the culture medium. The liquid portion of the culture medium is discarded through pipe means (not shown) and the cells are passed through line 71 to the dryer 72. After drying, the cells are passed through line 73 to storage.

Probe 22 penetartes below the liquid level 74 and monitors the pH of the culture medium. When the pH goes below a predetermined level, the probe 22 activates switch 44 to operate pump 50 which pumps ammonia from the reserovir 52 through the lines 51 and 13 to the culture medium. When the pH has risen to its predetermined level, the probe operates to open switch 44 which stops pump 50.

Probe 23 is positioned such that its tip is above the liquid level 74 a distance is the maximum desired foam height. When the foam level has reached this distance, the top of the foam touches the tip of the probe. The foam, which, of course, contains aqueous mineral salt nutrient, is electrically conductive and upon touching the tip of the probe closes the circuit between the probe and the ground connector 31. Closing the circuit closes switch 30, setting into operation pumps 33 and 34 which thereupon pump antifoaming agent and hydrocarbon substrate into the fermenter at the desired rate and relative amounts. When the level of the foam subsides below the tip of the probe, the circuit between the probe and the ground connector is broken, the switch 30 opens and the pumps 33 and 34 stop.

The following example will be illustrative of the invention.

An inoculum of Brevibacterium sp. was introduced into a fermenter containing ten liters of aqueous mineral salt nutrient. The fermenter was provided with a foam-detecting probe of the type previously described and the probe was placed so as to be activated when the foam height was one-half inch. The probe was connected to a pump to introduce hydrocarbon substrate containing antifoaming agent at a controlled rate to the fermenter. The hydrocarbon substrate contained 4.5 percent by weight of the weakly cationic amine-type compound mentioned earlier. The mineral salts in this nutrient were in a concentration three times that required for growth of the bacterium except for magnesium and ammonium sulfates which were in a concentration required for growth of the bacterium. Added to the mixture of inoculum and aqueous mineral salt nutrient was 0.001 percent by weight of oxyethylene ether of nonyl phenol containing 5 moles of ethylene oxide as a foaming agent. There was also introduced into the fermenter 0.1 liter of n-hexadecane as the hydrocarbon substrate. Air was introduced by injection into the culture medium and growth of the microorganism began. When the cell density became 9 grams of cells per liter of culture medium, continuous operations were initiated. The foam height at this stage was one-half inch and was contacting the tip of the probe.

Initiation of continuous operations was effected by introducing the aqueous mineral salt nutrient into the fermenter. Since the foam was touching the tip of the probe, the probe activated the pump to introduce n-hexadecane containing 4.5 percent by weight of "Alkaterge C" into the fermenter in the proportion of 100 volumes of the aqueous mineral salt nutrient to 11 volumes of the n-hexadecane containing the antifoaming agent. The dilution rate of the combined streams of aqueous mineral salt nutrient and hydrocarbon substrate was $0.1^{-1}$, i.e., 1 liter of combined aqueous mineral salt nutrient and hydrocarbon substrate was introduced into the fermenter per hour. Effluent containing cell product was removed, as overflow, from the fermenter at a rate equal to the rate of the introduced streams. Introduction of the air was continued.

Within a few moments of the introduction of the n-hexadecane containing the antifoaming agent, the foam level subsided below the tip of the probe and the pump providing the hydrocarbon substrate shut off. The foam level shortly thereafter reached the height of 3 inches and touched the probe, again activating the pump to introduce n-hexadecane containing the antifoaming agent. The foam level again subsided below the tip of the probe and the supply of hydrocarbon substrate was discontinued. Thereafter, throughout the growth procdure, hydrocarbon substrate would be introduced into the culture medium in the fermenter only when the foam level was sufficiently high to contact the probe.

Effluent from the fermenter was treated as by centrifugation to separate the cells of the microorganism therefrom. The cells were then washed with isopropanol by passing 0.8 liter of isopropanol through 30 grams of the separated cells. After the washing, the cells contained 0.65 percent by weight of n-hexadecane. In another continuous cell operation wherein the n-hexadecane was introduced continuously into the culture medium rather than in response to the foam level but wherein conditions were otherwise the same, the n-hexadecane content of the cells after washing with the isopropanol was 5.0 percent by weight.

We claim:

1. In a process for the growth of a microorganism in a culture medium on a substrate containing hydrocarbons or hydrocarbon derivatives as the principal carbon source which are partially water-insoluble, the improvement for maintaining the amount of said substrate in said culture medium during growth of said microorganism and, as a result, the amount of said substrate as a residue in the product of said process, at a low value comprising:

(a) introducing an inoculum of said microorganism, said substrate, an aqueous mineral salt nutrient, and an oxygen-containing gas into a fermenter to form a culture medium therein, the amount of said substrate introduced being not more than 75 percent of that required to attain, by growth, the maximum density of cells of said microorganism in said culture medium, (b) continuing injection of said oxygen-containing gas to effect growth of said microorganism in said culture medium but, of said inoculum, substrate, and aqueous mineral salt nutrient, discontinuing introduction of at least said substrate, (c) thereafter each time a foam layer of a predetermined height forms on the surface of said culture medium introducing additional substrate, the formation of said foam layer of said predetermined height being indicative of consumption of said substrate, by growth, of said microorganism to a low value in said culture medium and the amount of said additional substrate introduced at any one time being not in excess of that required to attain, by growth, said maximum density of cells of said microorganism in said culture medium but sufficient to effect subsidence of said foam layer, and (d) introducing an antifoaming agent into said fermenter by the time the introduction of at least a portion of said additional substrate is completed.

2. The process of claim 1 wherein said antifoaming agent is introduced into said fermenter prior to the introduction of any of said substrate.

3. The process of claim 1 wherein said antifoaming agent is introduced into said fermenter simultaneously with at least a portion of said additional substrate.

4. The process of claim 1 wherein said antifoaming agent is introduced into said fermenter in mixture with said additional substrate.

5. The process of claim 1 wherein said culture medium contains a foaming agent.

6. The process of claim 5 wherein said foaming agent is ethylene oxide ether of nonyl phenol containing 5 moles of ethylene oxide.

7. The process of claim 1 wherein said substrate is a hydrocarbon substrate.

8. The process of claim 1 wherein said substrate is an oxygenated hydrocarbon containing at least 5 carbon atoms.

9. In a batch process for the growth of a microorganism in a culture medium on a substrate containing hydrocarbons or hydrocarbon derivatives as the principal carbon source which are partially water-insoluble, the improvement for maintaining the amount of said substrate in said culture medium during growth of said microorganism and, as a result, the amount of said substrate as a residue in the cell product of said process, at a low value comprising:

(a) introducing an inoculum of said microroganism, said substrate, an aqueous mineral salt nutrient, and and oxygen-containing gas into a fermenter to form a culture medium therein, the amount of said substrate introduced being not more than 75 percent of that required to attain, by growth, the maximum density of cells of said microorganism in said culture medium, (b) continuing injection of said oxygen-containing gas to effect growth of said microorganism in said culture medium but discontinuing introduction of said inoculum, substrate, and aqueous mineral salt nutrient, (c) thereafter each time a foam layer of a predetermined height forms on the surface of said culture medium introducing additional substrate, the formation of said foam layer of said predetermined height being indicative of consumption of said substrate, by growth, of said microorganism to a low value in said culture medium and the amount of said additional substrate introduced at any one time being not in excess of that required to attain, by growth, said maximum density of cells of said microorganism in said culture medium but sufficient to effect subsidence of said foam layer, and (d) introducing an antifoaming agent into said fermenter by the time the introduction of at least a portion of said additional substrate is completed.

10. In a continuous process for the growth of a microorganism in a culture medium on a substrate containing hydrocarbons or hydrocarbon derivatives as the principal carbon source which are partially water-insoluble, the improvement for maintaining the amount of said substrate in said culture medium during growth of said microorganism and, as a result, the amount of said substrate as a residue in the cell product of said process, at a low value comprising:

(a) introducing an inoculum of said microorganism, said substrate, an aqueous mineral salt nutrient, and an oxygen-containing gas into a fermenter to form a culture medium therein, the amount of said substrate introduced into said fermenter being not more than 75 percent of that required to attain, by growth, the maximum density of cells of said microorganism in said culture medium, (b) continuing injection of said oxygen-containing gas to effect growth of said microorganism in said culture medium but discontinuing introduction of said inoculum, substrate, and aqueous mineral salt nutrient, (c) at a point in the exponential growth phase of said microorganism beginning continuous introduction of said aqueous mineral salt nutrient and continuous removal of an effluent stream containing cells of said microorganism.

(d) thereafter each time a foam layer of a predetermined height forms on the surface of said culture medium introducing additional substrate into said fermenter, the formation of said foam layer of said predetermined height being indicative of consumption of said substrate, by growth, of said microorganism to a low value in said culture medium and the amount of said additional substrate introduced into said fermenter at any one time being not in excess of that required to attain, by growth, said maximum density of cells of said microorganism in said culture medium but sufficient to effect subsidence of said foam layer, and (e) introducing an antifoaming agent into said fermenter by the time the introduction of at least a portion of said additional substrate is completed.

References Cited

UNITED STATES PATENTS 3,293,145  12/1966  Leavitt et al. ........ 195—3 H

A. LOUIS MONACELL, Primary Examiner

G. M. NATH, Assistant Examiner

U.S. Cl. X.R.

195—49, 109, 115, 139

UNITED STATES PATENT OFFICE
CERTIFICATE OF CORRECTION

Patent No. 3,672,953                     Dated June 27, 1972

Inventor(s) Vernon F. Coty, Israel J. Heilweil, Richard I. Leavitt

It is certified that error appears in the above-identified patent and that said Letters Patent are hereby corrected as shown below:

Column 3, line 13, "agents" should be --agent--.

Column 4, line 46, "hyrrocarbons" should be --hydrocarbons--;
line 69, "residue" should be --residua--;
line 74, "atmos" should be --atoms--.

Column 5, line 21, "neutrient" should be --nutrient--.

Column 6, line 63, after "including" insert --sucrose monolaurate, sucrose monostearate, sucrose--.

Column 7, line 50, "microorganism." should be --microorganisms.--

Column 9, line 4, "deensity" should be --density--.

Column 11, line 27, before "salt" insert --mineral--;
line 41, "penetartes" should be --penetrates--;
line 50, between "distance" and "is" insert --which--.

Column 13, line 51, before "oxygen-containing", "and" should be --an--.

Column 14, line 37, the period (.) should be a comma (,).

Signed and sealed this 19th day of December 1972.

(SEAL)
Attest:

EDWARD M. FLETCHER, JR.                ROBERT GOTTSCHALK
Attesting Officer                      Commissioner of Patents